United States Patent
Ma et al.

(10) Patent No.: US 11,596,108 B2
(45) Date of Patent: Mar. 7, 2023

(54) LIGHT SOURCE FOR INDOOR PLANT CULTIVATION

(71) Applicant: FUJIAN SANAN SINO-SCIENCE PHOTOBIOTECH CO., LTD., Quanzhou (CN)

(72) Inventors: Jian Ma, Quanzhou (CN); Yang Li, Quanzhou (CN); Yiqun Chen, Quanzhou (CN); Shaohua Li, Quanzhou (CN); Tingting Wang, Quanzhou (CN); Yukai Yang, Quanzhou (CN); Guojie Liu, Quanzhou (CN)

(*) Notice: Subject to any disclaimer, the term of this patent is extended or adjusted under 35 U.S.C. 154(b) by 0 days.

(21) Appl. No.: 17/420,689

(22) PCT Filed: May 8, 2019

(86) PCT No.: PCT/CN2019/085972
§ 371 (c)(1),
(2) Date: Jul. 5, 2021

(87) PCT Pub. No.: WO2020/164194
PCT Pub. Date: Aug. 20, 2020

(65) Prior Publication Data
US 2022/0095545 A1  Mar. 31, 2022

(30) Foreign Application Priority Data
Feb. 15, 2019 (CN) .......................... 201910117762.2

(51) Int. Cl.
*A01G 7/04* (2006.01)
(52) U.S. Cl.
CPC .................... *A01G 7/045* (2013.01)
(58) Field of Classification Search
CPC .................... A01G 7/045; F21V 9/02
See application file for complete search history.

(56) References Cited

U.S. PATENT DOCUMENTS

2010/0259190 A1* 10/2010 Aikala .................... H01L 33/50
257/E33.061
2018/0007838 A1   1/2018 McCord

FOREIGN PATENT DOCUMENTS

| CN | 106665319 A | 5/2017 |
| CN | 106718183 A | 5/2017 |

(Continued)

*Primary Examiner* — Karabi Guharay
(74) *Attorney, Agent, or Firm* — Rumit R. Kanakia

(57) ABSTRACT

The present invention relates to the technical field of plant cultivation through artificial light, and particularly provides a light environment method for plant cultivation through full-artificial light to provide a full-artificial light source for plant growth. The light source includes a light wave with a waveband of 620 nm to 760 nm, and the number of photons of the light wave of 620 nm to 760 nm accounts for 64% to 76% of the total number of photons of the light source. Compared with traditional light sources, such as existing fluorescent lamps and high-pressure sodium lamps, the present invention adopting a mode of light source proportion and light source combination can greatly improve the yield of the plant. Compared with a traditional LED lamp light source proportion scheme, the light source proportion scheme of the present invention has the advantages that the waveband of a selected light source is more precise, the influence caused by other plant growth parameters is small, and a more targeted effect is achieved in the process of promoting plant growth. By using the precise combination and proportion of the precise waveband of the light wave, a peak wavelength and a photon proportion, the present invention can more precisely control a plant growth effect, and thereby promoting the plant growth.

8 Claims, 10 Drawing Sheets

(56) References Cited

FOREIGN PATENT DOCUMENTS

| CN | 109644721 A | 4/2019 |
| JP | 2000135031 A | 5/2000 |

\* cited by examiner

LIGHT SOURCE FOR INDOOR PLANT CULTIVATION

BACKGROUND

Technical Field

The present invention relates to the technical field of plant cultivation through artificial light, and particularly relates to a light source for plant cultivation through full-artificial light.

Related Art

Light is a basic environmental factor for plant growth and development. It is not only a basic energy source for photosynthesis, but also an important regulatory factor for plant growth and development, and plays an important role on the morphogenesis, reproductive development and secondary metabolite regulation and control of the plant. The plant growth and development are influenced by the light quality, illumination intensity, illumination period and illumination mode. According to traditional cognition, all things grow in a way of being dependent on the sun, on the earth, the sun is the main source of visible (i.e., light) and invisible electromagnetic radiation, and it is the main factor sustaining the life. The net daily average solar energy reaching the earth is about 28×10^23 J (i.e., 265 EBtu). This value is 5500 times the world annual primary energy consumption of 479 Pbtu estimated in 2007. The spectral distribution of solar radiation which can be measured on the surface of the earth has a wide band range between about 300 nm and 1000 nm. However, only 50% of the radiation reaching the surface of the earth is photosynthetically active radiation (PAR), i.e., the radiation energy between 400 nm and 700 nm. Plants absorb and transform light energy mainly through photosynthetic systems, photoreceptors of the plants are active elements mainly existing on the leaves of plants, and are responsible for capturing photons and converting photon energy into chemical energy.

The era of artificial light sources began with the Edison bulb, i.e., the incandescent lamp, developed by Thomas Edison in 1879. Therefore, the application of artificial light sources in the field of plant lighting was first started from the incandescent lamps, mainly passed through the stages of fluorescent lamps and high-pressure sodium lamps (HPS), and has reached the stage of LED lamps at present. The incandescence is characterized by a large amount of far-infrared radiation, which can reach about 60% of the total PAR, but the electricity efficiency of the incandescent lamps defined by the conversion efficiency between the electrical energy (input) and the emitted light energy (output) in the visible spectrum is still very low, and is usually about 10%. The service life of the incandescent lamp is not longer than 1000 hours, and is short, so that its application to plant growth is limited. Compared with the incandescent lamp, the fluorescent lamp achieves improved electricity-light energy conversion efficiency, and has the power usually less than 40 W. The electricity-to-light conversion efficiency of international brand T8 or T5 fluorescent lamps is close to 30%, and the electricity-to-light conversion efficiency of general products is between 20% and 30%, wherein more than 90% of the emitted photons are in the PAR range, the blue light energy depends on the correlated color temperature (CCT) of the lamps, and can reach 10% or higher of the total photon emission in the PAR range. Therefore, for plant varieties with weak light demand or in short-distance application scenarios, fluorescent lamps are widely used in sealed growth rooms and artificial climate boxes to completely replace sunlight. The high-pressure sodium lamp (HPS) belongs to a gas discharge lamp with the power generally in a range of 400 W to 1000 W and the electricity-to-light conversion efficiency in a range of 30% to 35%, about 70% of the emitted photons are in the PAR range, and the HPS is often used as a preferred light source for high-light-demand plants or crop production in greenhouses throughout the year. However, the achievable spectral energy distribution of both the fluorescent lamp and the high-pressure sodium lamp is limited due to their spectral design limitation, and the spectral quality is not optimal for promoting photosynthesis and photomorphogenesis, so that excessive growth of leaves and stems is caused. This is due to the unbalanced spectral emission related to the absorption peaks of important photosynthetic pigments such as chlorophyll a, chlorophyll b, and β carotene. Additionally, different types of plants have different requirements on the light environment, this will cause very low effective conversion energy efficiency and great energy waste, so that the operation cost increase of indoor plant cultivation through artificial light is caused.

Therefore, based on the above reasons, light-emitting diodes (LED) and related solid-state lighting (SSL) are potentially feasible and promising tools for plant lighting. The LED has various advantages such as high luminous efficiency, long service life, narrow spectrum and high spectral selectivity. However, novel commercial high-brightness LED products have the main energy in a green-yellow wavelength range of 500 nm to 600 nm, which have the efficient response to human vision, but cannot effectively respond to the photosynthesis process. According to technical principles, the spectrum efficiently responding to the photosynthesis can be realized by combining different types of semiconductors or photoluminescent materials such as GaN, GaAs and GaP.

At present, plants cultivated through artificial light mainly include leaf vegetables, solanaceous vegetables, medicinal plants, hemp plants, floral plants, model plants, large economic crops, high-value shrubs, etc. In the prior art, spectral energy distribution characteristics, such as peak wavelength, RB and R/FR at different growth stages of different plants have been disclosed, and even specific energy distribution data has been provided for specific growth stages of specific plants, but a spectrum capable of meeting the joint healthy growth of various kinds of the above plants has not been provided.

A first objective of the present invention is to provide a light source capable of meeting the healthy growth of various plants under full-artificial light, and its healthy growth includes a complete process of the whole growth and development.

A second objective of the present invention is that the provided spectrum meets the proceeding of efficient photosynthesis and achieves the functions of obvious yield improvement and quality improvement compared with the traditional fluorescent lamp or HPS.

A third objective of the present invention is that through the optimization via a great number of scientific research experiments on the provided spectrum, the spectrum energy beneficial to the photosynthesis, morphogenesis, reproductive development and the like of the plant is improved, and the spectrum energy with low plant utilization rate and little influence on plants is reduced.

A fourth objective of the present invention is that the provided spectrum can be realized by adopting an LED technology, and an illumination apparatus using the spectrum can realize higher electricity-light conversion efficiency and better energy-saving effect.

SUMMARY

In order to achieve the above objectives, a more precise light source which has less adjusting parameter types and can avoid requirement of more frequent parameter control in the plant growth process due to adjustment of too much types of parameters needs to be provided; in addition, the precise control of a single type of parameter can more precisely control the plant growth effect, and thus promoting the plant growth.

In order to achieve the above objectives, the present invention provides a spectrum for plant cultivation through full-artificial light, a full-artificial light source is provided for plant growth, the light source includes a light wave with a waveband of 620 nm to 760 nm, and the number of photons of the light wave of 620 nm to 760 nm accounts for 64% to 76% of the total number of photons of the light source.

Generally, the plant is cultivated indoor. A greenhouse planting mode can be adopted.

Preferably, the number of photons in a waveband of 700 nm to 760 nm in the light source accounts for 3% to 38% of the number of the photons in the waveband of 620 nm to 760 nm.

Preferably, a peak wavelength of the light wave with the waveband of 620 nm to 760 nm is preferably in a range of 650 nm to 700 nm or 730 nm to 740 nm.

Further preferably, the peak wavelength of the light wave with the waveband of 620 nm to 760 nm is preferably one or a combination of two or three of 650 nm, 660 nm, 680 nm, 695 nm, and 735 nm.

Preferably, the light wave with the waveband of 620 nm to 760 nm is realized by using an LED light source.

Preferably, a full width at half maximum of the light wave corresponding to the peak wavelength in the range of 650 nm to 700 nm or 730 nm to 740 nm is smaller than 35 nm.

Preferably, the light source further includes a light wave with a waveband of 400 nm to 499 nm, and a ratio of the total number of the photons in the waveband of 620 nm to 760 nm to the total number of photons in the waveband of 400 nm to 499 nm is 4-7:1.

Preferably, a peak wavelength of the light wave with the waveband of 400 nm to 499 nm is preferably in a range of 430 nm to 460 nm.

Further preferably, the peak wavelength of the light wave with the waveband of 400 nm to 499 nm is preferably one or a combination of any two or three of 435 nm, 440 nm, 450 nm, and 460 nm.

Preferably, a full width at half maximum of the light wave corresponding to the peak wavelength in the range of 430 nm to 460 nm is smaller than 35 nm.

Preferably, the light source further includes a light wave with a waveband of 500 nm to 599 nm, and a ratio of the total number of the photons of the light wave with the waveband of 620 nm to 760 nm to the total number of photons of the light wave with the waveband of 500 nm to 599 nm is 3-8:1.

Preferably, the plant is selected from at least one of tomato, cucumber, sweet pepper, lettuce, rice, wheat, cotton and corn.

Preferably, the method specifically includes seeding and growth management. The seeding adopts the prior art. The growth management refers to necessary management on the germinated plant, such as fertilization, watering, light source configuration and environment condition.

Preferably, the plant can be a medicinal material and a hemp plant.

Tomato: tomato, (scientific name: *Lycopersicon esculentum* Mill.), is an annual or perennial herb plant of *Lycopersicon* in Solanaceae of Tubiformes.

Cucumber: cucumber, (scientific name: *Cucumis sativus* L.), is an annual sarmentous or climbing herb plant of Cucurbitaceae.

Sweet pepper: green bell pepper, (scientific name: *Capsicum annuum* var. *grossum*), is commonly known as bell pepper, big *capsicum* and sweet pepper, also called Datongzi in Taiwan, belongs to a variety of pepper of *Capsicum* in Solanaceae, is distributed in the north and south of China mainland and belongs to a plant of a non-artificial introduction and cultivation type.

Lettuce: lettuce, (scientific name: *Lactuca sativa* Linn.), is an annual or biennial herb plant of *Lactuca* in Compositae.

Rice: rice is a genus in herbaceous oryza, belongs to cereals, is also the most important and long-standing type of grain in oryza, and is different from upland rice.

Wheat: wheat is a common name of wheat plants, is a monocotyledonous plant, is a gramineous plant widely planted in all parts of the world, the caryopsis of wheat is one of the staple foods for human beings, and the wheat can be made into bread, steamed bread, biscuits, noodles and the like after being ground into flour, and can be made into beer, alcohol, Baijiu (such as vodka), or biofuel after being fermented.

Cotton: cotton is seed fiber of a *Gossypium* plant in Malvaceae, and originates in the subtropical zone.

Corn: corn, (Latin name: *Zea mays* L.), is an annual herb plant of *Zea* in Gramineae.

Preferably, the method further includes growth environment conditions: an environment temperature is 21° C. to 24° C. at daytime and 18° C. to 20° C. at night, and a humidity is 60% to 80%.

Preferably, a cultivation medium of the plant can be soil, and can also be a nutrient solution.

When the cultivation is performed by using the nutrient solution, young seedlings can be separately planted onto a water cultivation module, ⅔ root systems are maintained to be soaked in the nutrient solution, and different nutrition solutions are used according to different plants. For example, a Hoagland nutrient solution is used as a nutrient solution for *Lactuca sative*. An EC of the nutrient solution is 1.6 to 1.8, a pH is 5.5 to 7.5, a temperature of the nutrient solution is 18° C. to 22° C., and a dissolved oxygen content is 5 mg/L to 6 mg/L.

Preferably, the method further includes seeding and pregermination. For example, a seeding and pregermination method for *Lactuca sative* includes: selecting and putting full *Lactuca sative* seeds into warm water of 50° C. to 55° C. to be soaked for 15 min to 20 min; then, putting the seeds into clean water of 25° C. to 30° C. for seed soaking for 7 h to 8 h; seeding the seeds subjected to seed soaking into seedling breeding sponge blocks with one seed in each hole; adding pure water into a tray under the seedling breeding sponge blocks until the pure water level height is flushed with the lower surface of the sponge blocks; after seeding, spraying mist onto the seeds by a sprinkling can to maintain surface moisture; then, putting the seeds into a pregermination box of 22° C. to 25° C. for pregermination; maintaining the humidity at 70% to 80%; and spraying water onto the seeds once every 12 h.

The present invention has the following beneficial effects by adopting the above technical solution.

1. Compared with traditional light sources, such as existing fluorescent lamps and HPS, the present invention adopting a mode of the light source proportion and light source combination can greatly improve the yield of the plant.

2. Compared with a traditional LED lamp light source proportion scheme, the light source proportion scheme of the present invention has the advantages that the waveband of a selected light source is more precise, the influence caused by other plant growth parameters is small, and a more targeted effect and higher stability are achieved in the process of promoting plant growth. By using the precise combination and proportion of the precise waveband of the light wave, a peak wavelength and a photon proportion, the present invention can more precisely control a plant growth effect, and thereby promoting the plant growth.

DETAILED DESCRIPTION

Figure 1:
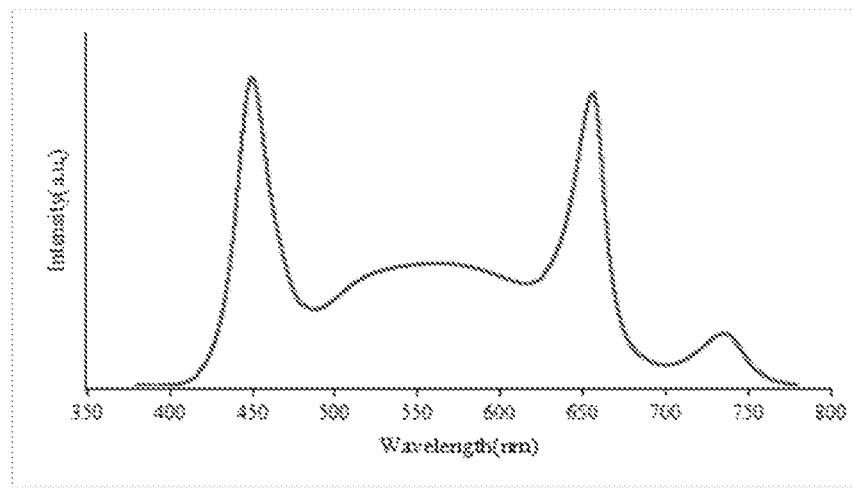
FIG. 1 is a schematic diagram of a light wave peak value of an LED lamp 1.
Figure 2:
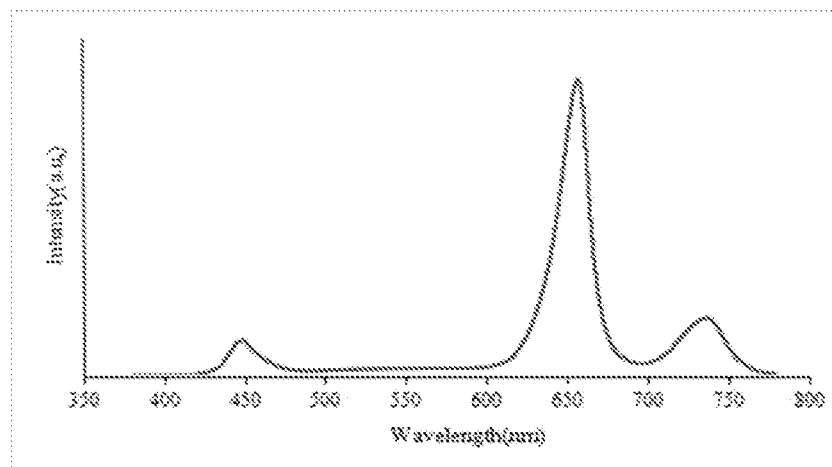
FIG. 2 is a schematic diagram of a light wave peak value of an LED lamp 2.
Figure 3:
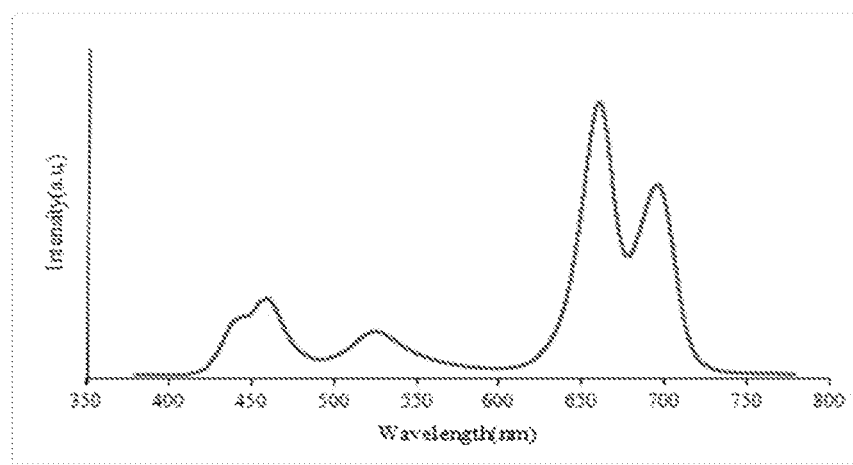
FIG. 3 is a schematic diagram of a light wave peak value of an LED lamp 3.
Figure 4:
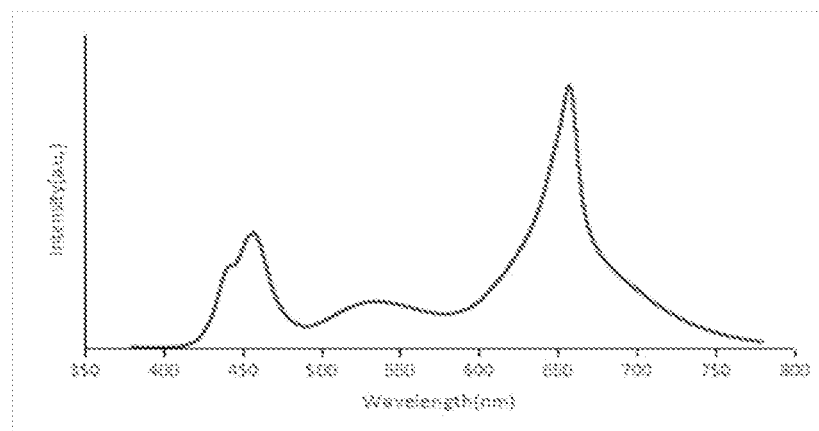
FIG. 4 is a schematic diagram of a light wave peak value of an LED lamp 4.
Figure 5:
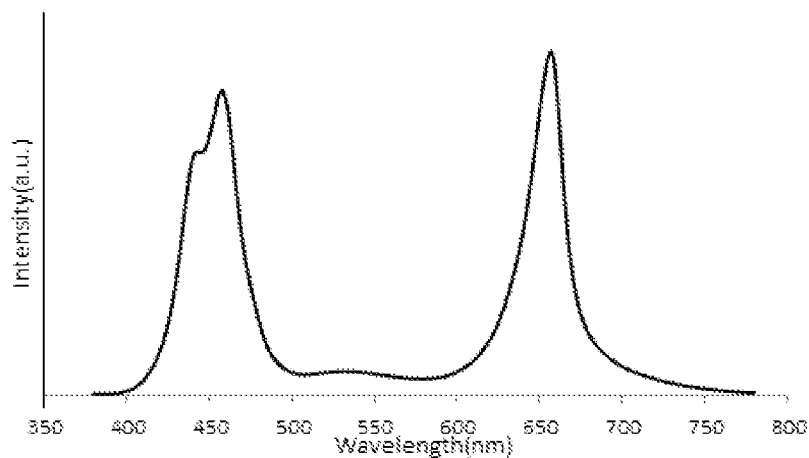
FIG. 5 is a schematic diagram of a light wave peak value of an LED lamp 5.
Figure 6:
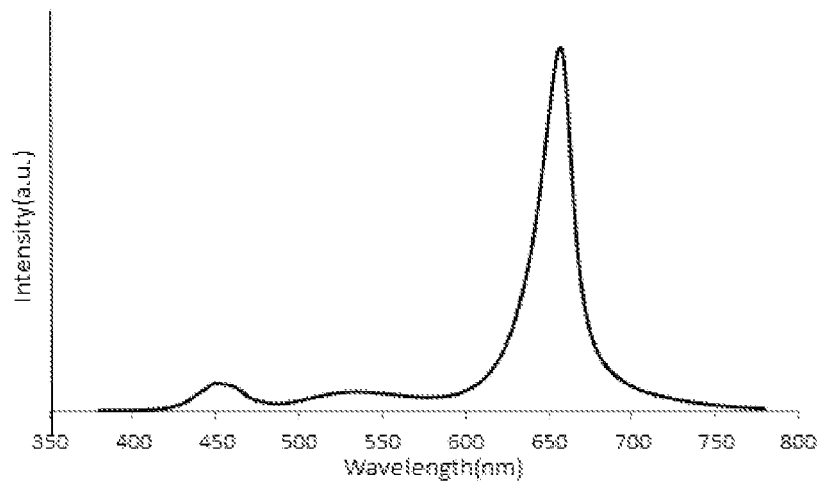
FIG. 6 is a schematic diagram of a light wave peak value of an LED lamp 6.
Figure 7:
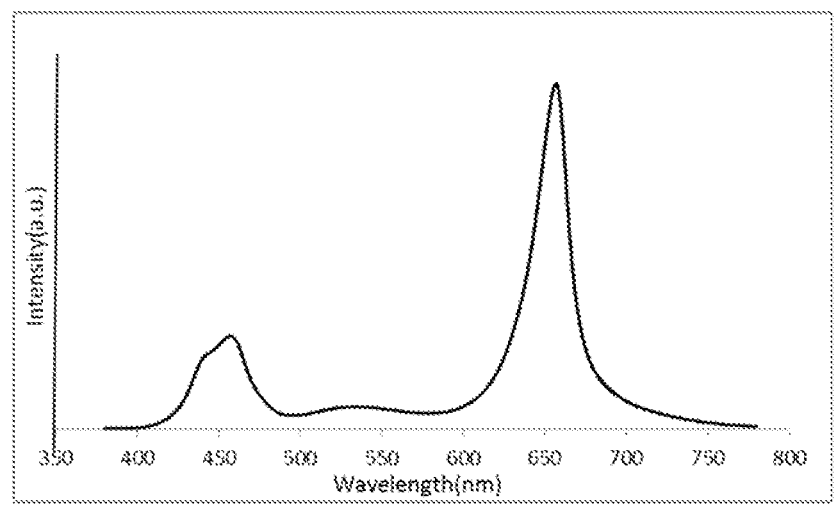
FIG. 7 is a schematic diagram of a light wave peak value of an LED lamp 7.
Figure 8:
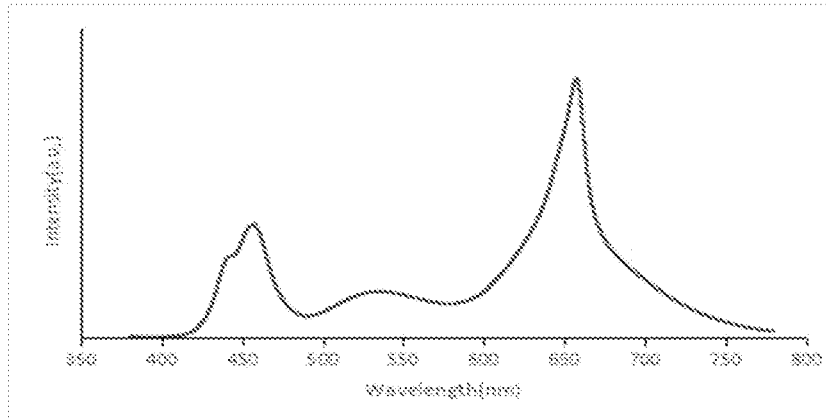
FIG. 8 is a schematic diagram of a light wave peak value of an LED lamp 8.
Figure 9:
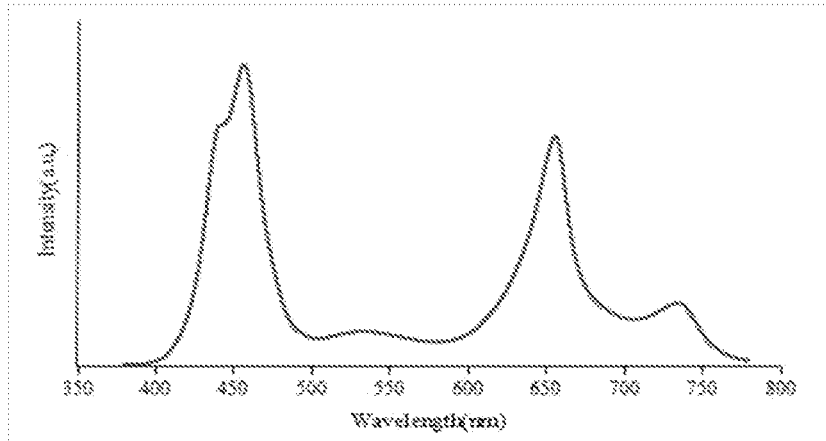
FIG. 9 is a schematic diagram of a light wave peak value of an LED lamp 9.
Figure 10:
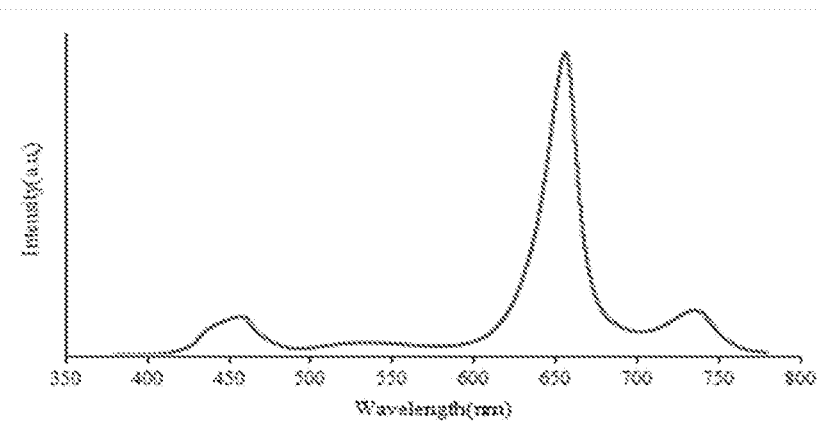
FIG. 10 is a schematic diagram of a light wave peak value of an LED lamp 10.
Figure 11:
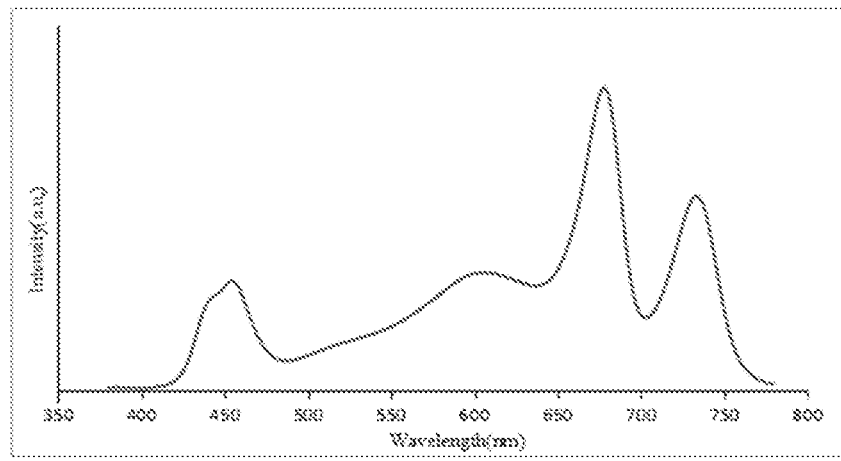
FIG. 11 is a schematic diagram of a light wave peak value of an LED lamp 11.
Figure 12:
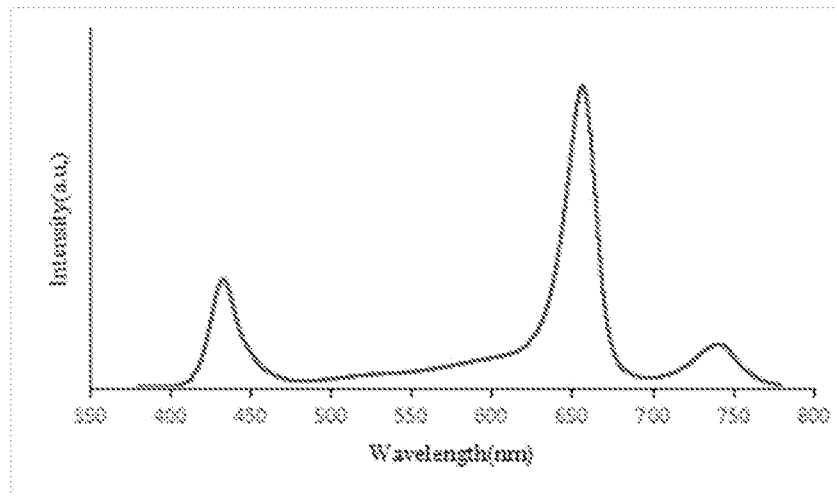
FIG. 12 is a schematic diagram of a light wave peak value of an LED lamp 12.
Figure 13:
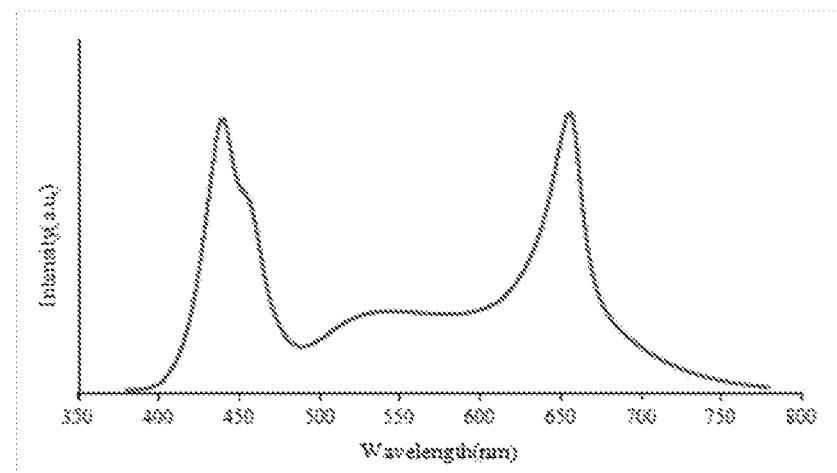
FIG. 13 is a schematic diagram of a light wave peak value of an LED lamp 13.
Figure 14:
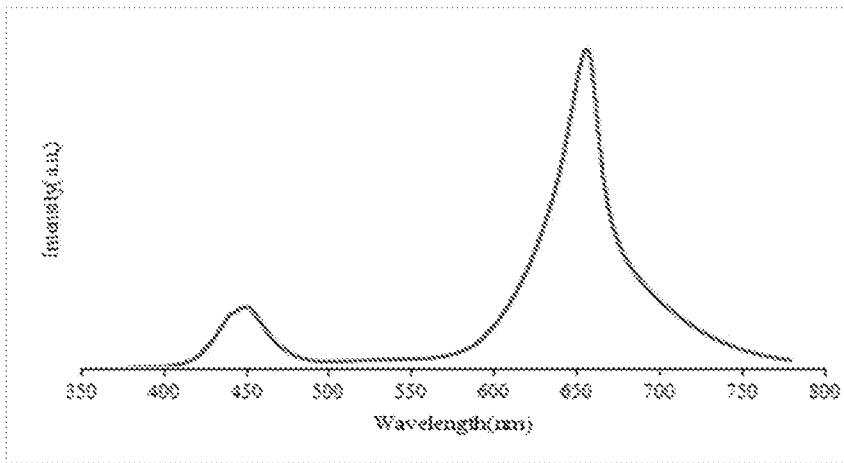
FIG. 14 is a schematic diagram of a light wave peak value of an LED lamp 14.
Figure 15:
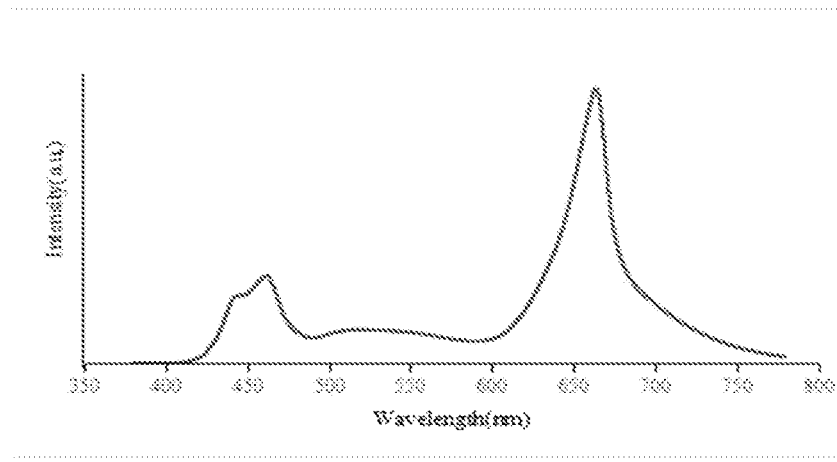
FIG. 15 is a schematic diagram of a light wave peak value of an LED lamp 15.
Figure 16:
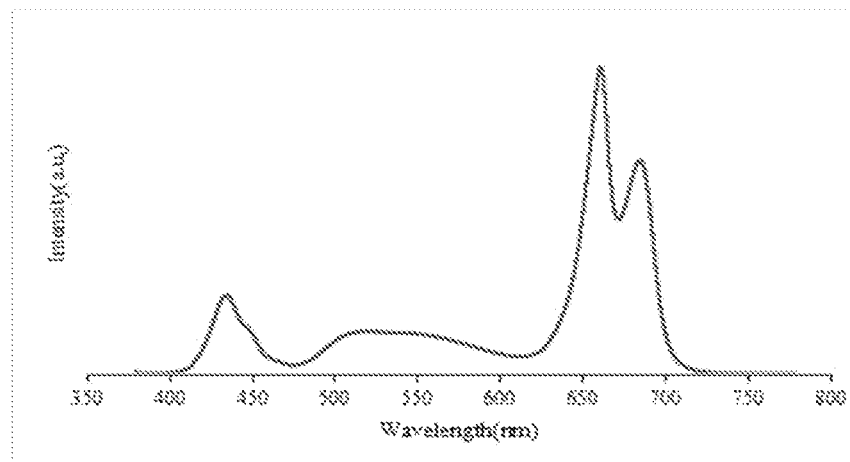
FIG. 16 is a schematic diagram of a light wave peak value of an LED lamp 16.
Figure 17:
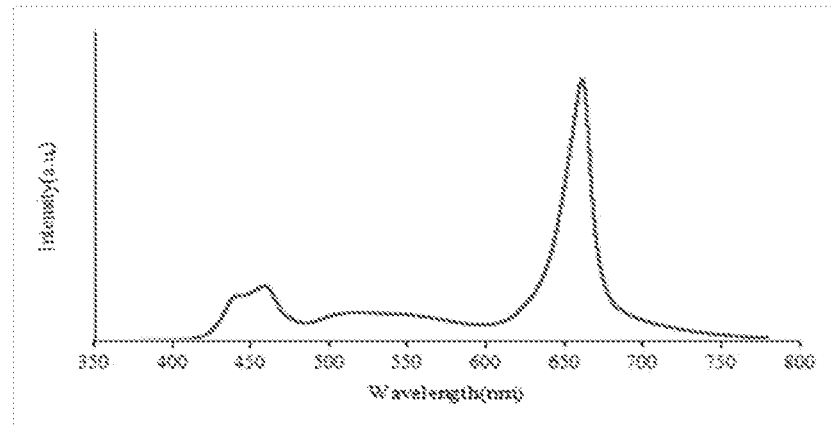
FIG. 17 is a schematic diagram of a light wave peak value of an LED lamp 17.
Figure 18:
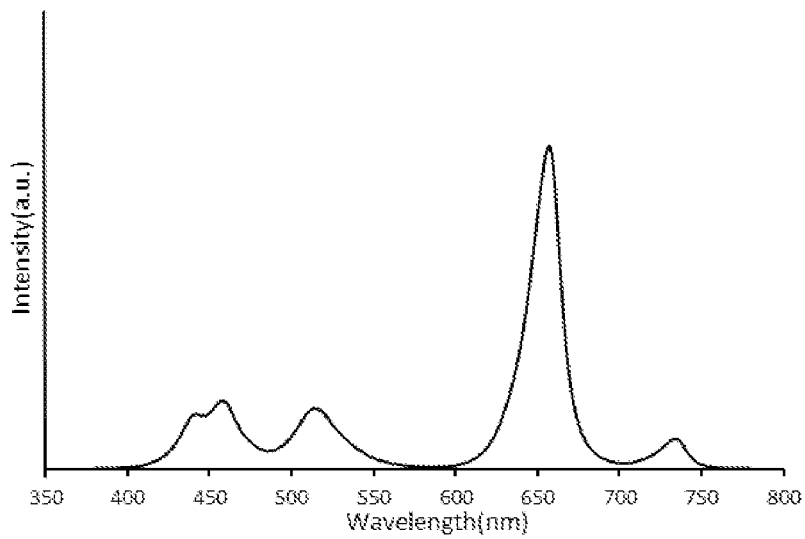
FIG. 18 is a schematic diagram of a light wave peak value of an LED lamp 18.
Figure 19:
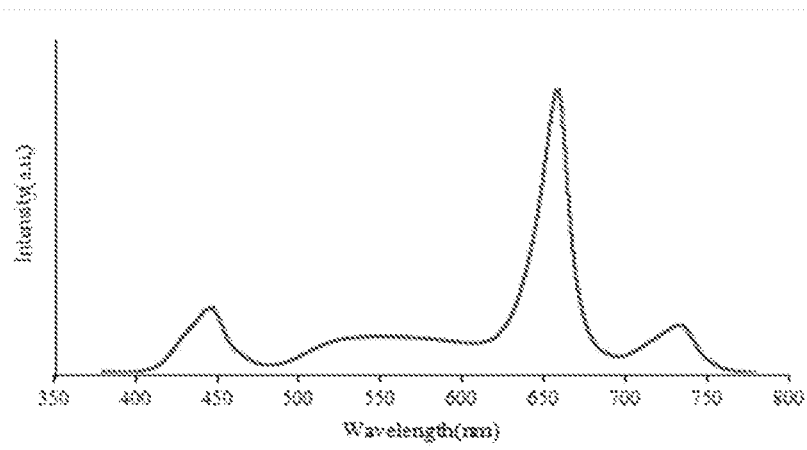
FIG. 19 is a schematic diagram of a light wave peak value of an LED lamp 19.
Figure 20:
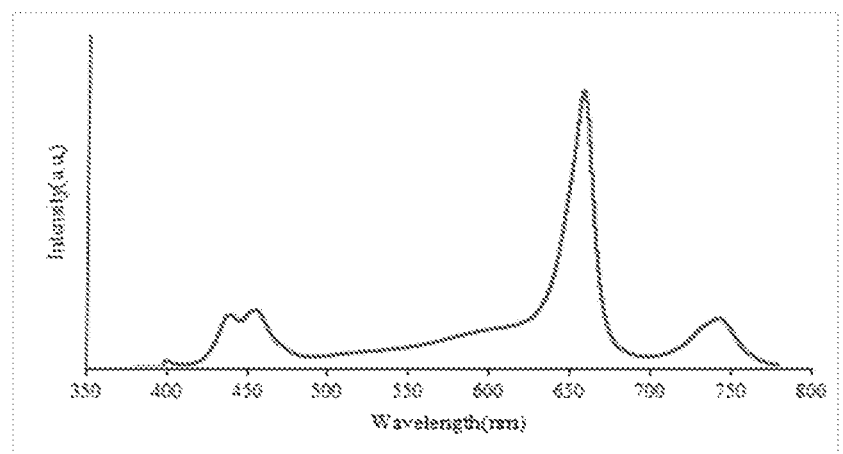
FIG. 20 is a schematic diagram of a light wave peak value of an LED lamp 20.
Figure 21:
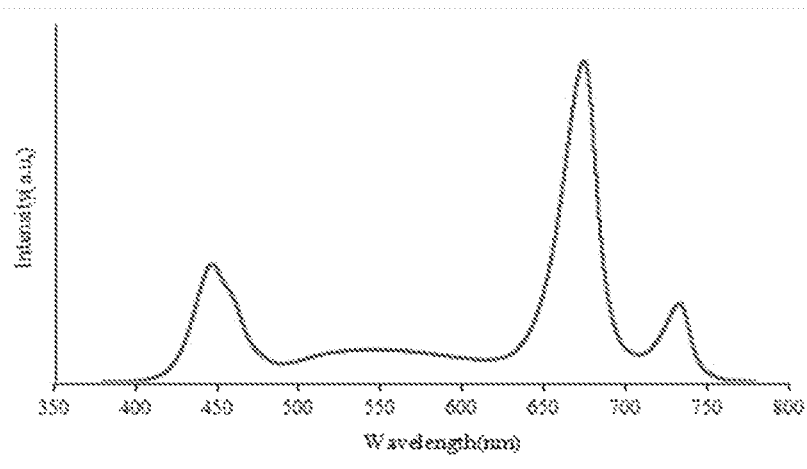
FIG. 21 is a schematic diagram of a light wave peak value of an LED lamp 21.
Figure 22:
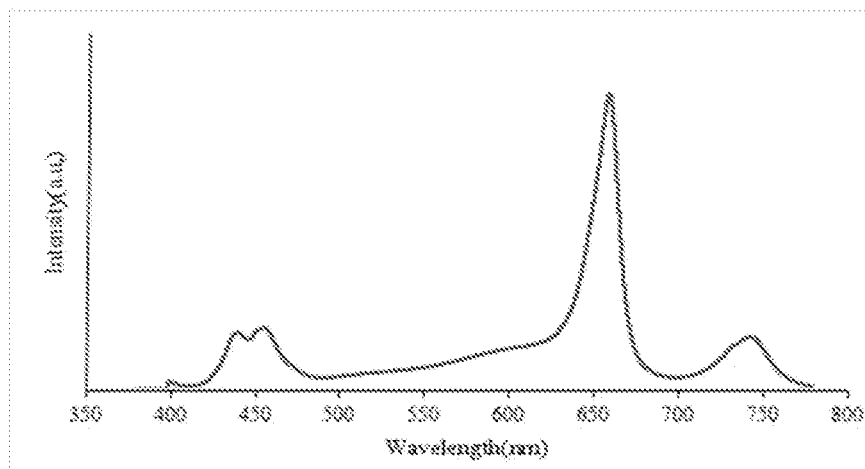
FIG. 22 is a schematic diagram of a light wave peak value of an LED lamp 22.
Figure 23:
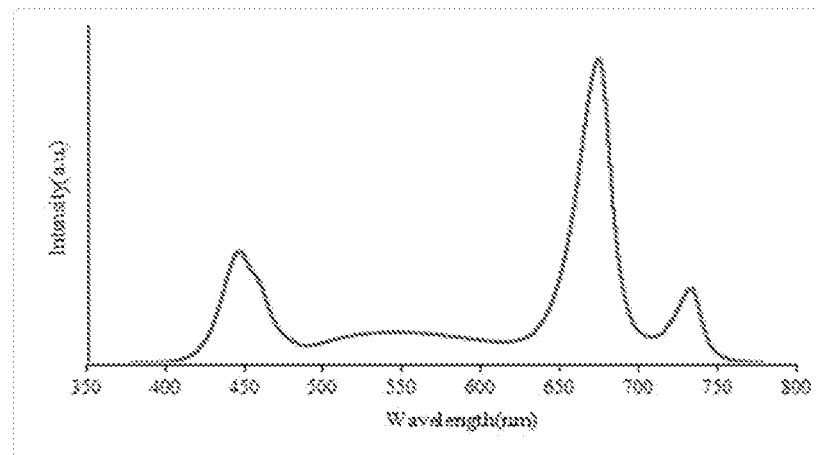
FIG. 23 is a schematic diagram of a light wave peak value of an LED lamp 23.
Figure 24:
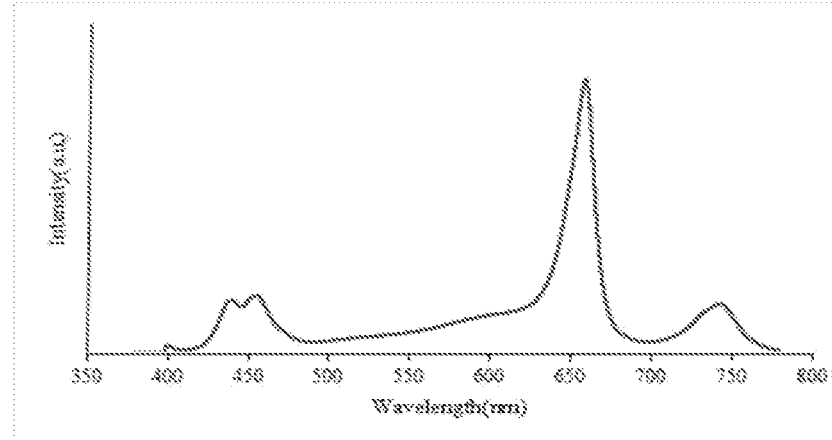
FIG. 24 is a schematic diagram of a light wave peak value of an LED lamp 24.
Figure 25:
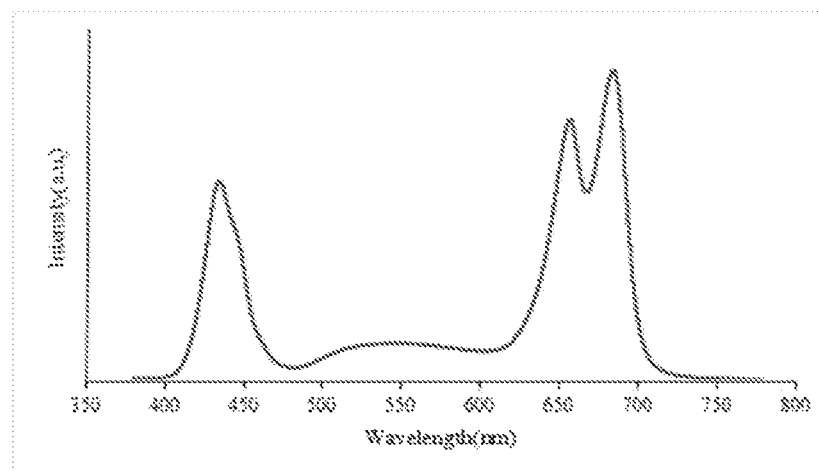
FIG. 25 is a schematic diagram of a light wave peak value of an LED lamp 25.
Figure 26:
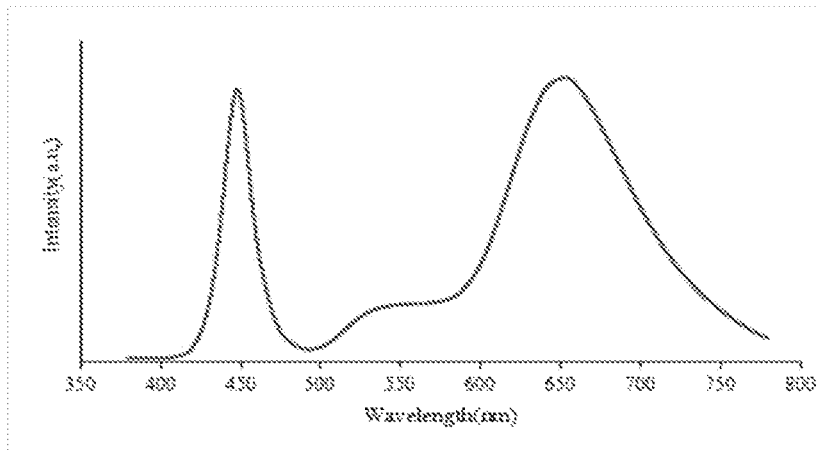
FIG. 26 is a schematic diagram of a light wave peak value of an LED lamp 26.
Figure 27:
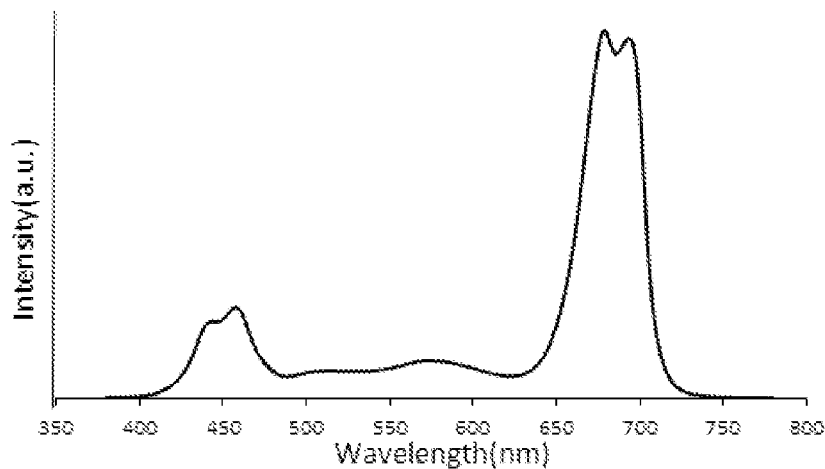
FIG. 27 is a schematic diagram of a light wave peak value of an LED lamp 27.
Figure 28:
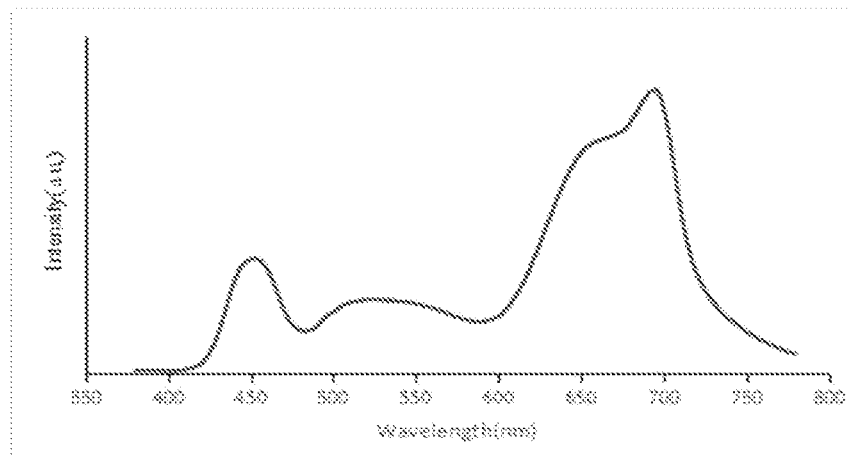
FIG. 28 is a schematic diagram of a light wave peak value of an LED lamp 28.
Figure 29:
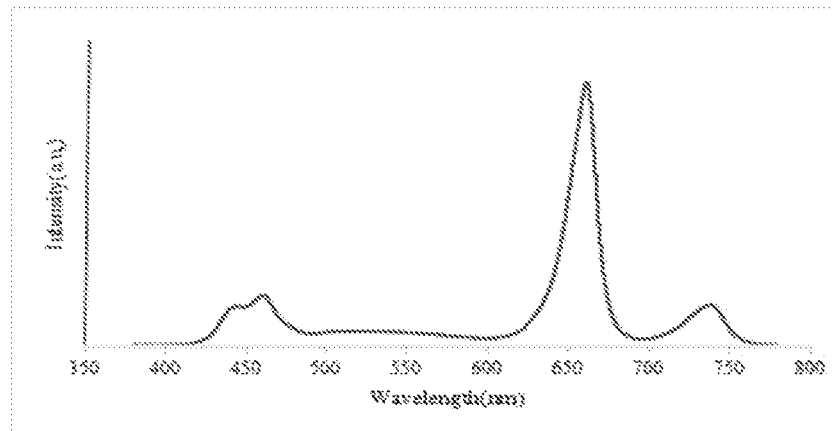
FIG. 29 is a schematic diagram of a light wave peak value of an LED lamp 29.
Figure 30:
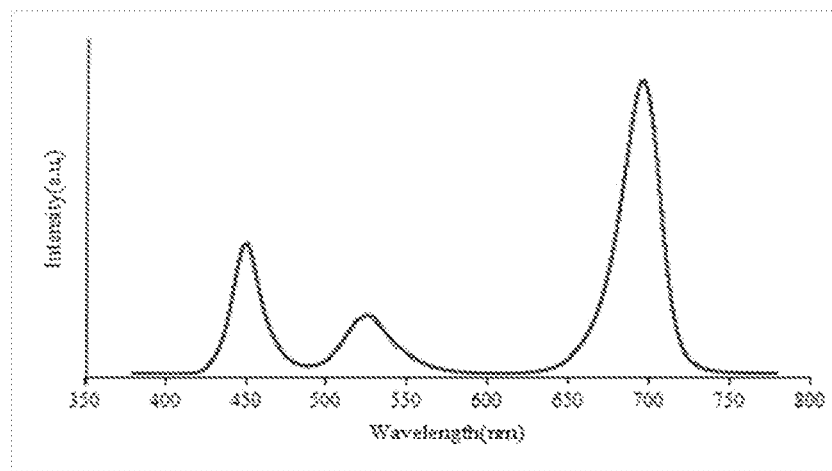
FIG. 30 is a schematic diagram of a light wave peak value of an LED lamp 30.

In order to describe the technical content, structural features, achieved objectives and effects of the technical solution in detail, detailed descriptions are given in combination with specific embodiments.

TABLE 1

Material and manufacturer

| Material | Manufacturer | Note (Article Number) |
|---|---|---|
| Lvdie Lactuca sative | Shandong Shouguang Hongwei Seed industry Co., Ltd | |
| Pakchoi | Shandong Shouguang Hongwei Seed industry Co., Ltd | |
| Cherry radish | Shandong Shouguang Hongwei Seed industry Co., Ltd | |
| Cannabis seedling | Fujian Zhongke Biological Co., Ltd | |
| Cucumber seed | Shanghai WELLS seed Co., Ltd | 31201600076 |
| Corn seed | Shandong Shouguang Hongwei Seed industry Co., Ltd | Zhengdan 958 |
| Tomato seed | Known-you Seed Co., Ltd | Known-you 301 |
| Sweet pepper seed | Known-you Seed Co., Ltd | |
| Lettuce seed | Shandong Shouguang Hongwei Seed industry Co., Ltd | |
| Rice seed | Shandong Shouguang Hongwei Seed industry Co., Ltd | |
| Wheat seed | Shandong Shouguang Hongwei Seed industry Co., Ltd | Nongda 212 |
| Pansy seed | Japan Takii company | |
| Anoectochilus formosanus bottle seedling | Xiamen Jiasheng Biotechnology Co., Ltd | |
| Dendrobium huoshanense bottle seedling | Huoshan Changchong Traditional Chinese Medical Material Development Co., Ltd | |

1. Leaf vegetables: full lvdie *Lactuca sative* seeds were selected and put into warm water of 50° C. to be soaked for 10 min, and were then put into clean water of 30° C. for seed soaking for 8 h. The seeds subjected to seed soaking were seeded into seedling breeding sponge blocks with one seed in each hole. Pure water was added into a tray under the seedling breeding sponge blocks until the pure water level height is flushed with the lower surface of the sponge blocks. After seeding, mist was sprayed onto the seeds by a sprinkling can to maintain surface moisture. Then, the seeds were put into a pregermination box of 25° C. for pregermination, and the humidity was maintained at 80%. The seeds were sprayed with water every 12 h. When the *Lactuca sative* seedlings grew to 4-5 leaves and one shoot, the *Lactuca sative* seedlings were separately planted onto a water cultivation module, ⅔ root systems were maintained to be soaked into a nutrient solution, an EC of the nutrient solution was 1.8, a pH was 6.0 to 7.0, a temperature of the nutrient solution was 22° C., and a dissolved oxygen content was 6 mg/L. An environment temperature condition was 23° C. at daytime and 18° C. at night. The light source used a fluorescent lamp as a reference CK, spectrums of 2 comparative examples and 2 embodiments were set, a light intensity was 250 μmol/m²·s, a light period was 9 h, and a planting period was 20 d. The *Lactuca sative* was cultivated according to the above cultivation method, light source parameters were used as each embodiment and comparative example, a fresh weight of each plant obtained in each embodiment and comparative example was weighed to obtain an average weight, and the appearance was evaluated. Results are shown in Table. 2:

the sponge blocks. After seeding, mist was sprayed onto the seeds by a sprinkling can to maintain surface moisture. Then, the seeds were put into a pregermination box of 25° C. for pregermination, and the humidity was maintained at 80%. After white seed surfaces were exposed, the seeds were moved to a position under an LED lamp for seedling breeding treatment. When the seedlings grew to 2 leaves and one shoot, the cherry radish seedlings were separately planted onto a water cultivation module, ⅔ root systems were maintained to be soaked into a nutrient solution, an EC of the nutrient solution was 1.8, a pH was 6.0 to 7.0, a temperature of the nutrient solution was 22° C., and a dissolved oxygen content was 6 mg/L. An environment temperature condition was 23° C. at daytime and 18° C. at night. The light source used a fluorescent lamp as a reference

TABLE 2

| Number | Lamp type | Spectrum feature — Ratio of the number of photons in a waveband of 620 nm to 760 nm to the number of photons in a waveband of 400 nm to 499 nm, peak value (nm), and full width at half maximum (nm) | | | Ratio of the number of photons in a waveband of 620 nm to 760 nm to the number of photons in a waveband of 500 nm to 599 nm Ratio | Proportion 1 (%) of the number of photons in a waveband of 620 nm to 760 nm in the whole light source, proportion 2 (%) of the number of photons in a waveband of 700 nm to 760 nm in the number of the photons in the waveband of 620 nm to 760 nm, peak value, and full width at half maximum (nm) Proportion 1 |
|---|---|---|---|---|---|---|
| | | Ratio | Peak value | Full width at half maximum | | |
| Comparative Example 1 | Fluorescent lamp | 0.4 | — | — | 0.3 | 12.1 |
| Comparative Example 2 | LED lamp 1 | 1.6 | 450 | 20 | 1.3 | 39.1 |
| Comparative Example 3 | LED lamp 2 | 14.7 | 450 | 20 | 17.8 | 86.1 |
| Embodiment 1 | LED lamp 3 | 5.8 | 460 | 20 | 3.8 | 74.7 |
| Embodiment 2 | LED lamp 4 | 4.1 | 460 | 20 | 8.0 | 64.0 |

| Number | Spectrum feature Proportion 1 (%) of the number of photons in a waveband of 620 nm to 760 nm in the whole light source, proportion 2 (%) of the number of photons in a waveband of 700 nm to 760 nm in the number of the photons in the waveband of 620 nm to 760 nm, peak value, and full width at half maximum (nm) | | | Biological index | |
|---|---|---|---|---|---|
| | Peak value | Full width at half maximum | Proportion 2 | Fresh weight of overground part of plant (g/plant) | Appearance |
| Comparative Example 1 | — | — | 18.3 | 78.6 | Normal |
| Comparative Example 2 | 660/735 | 20/23 | 18.8 | 80.12 | Normal |
| Comparative Example 3 | 660/735 | 20/23 | 22.3 | 97.25 | Abnormal (spindling, malformation and looseness) |
| Embodiment 1 | 660/695 | 20/25 | 17.8 | 93.4 | Normal |
| Embodiment 2 | 660 | 20 | 16.1 | 99.3 | Normal |

Test data shows that: the yield of the light source scheme of the embodiment was at least improved by 18.8% compared with that of a traditional fluorescent lamp, and the appearance was good.

2. Root vegetables: full Est cherry radish seeds were selected and were seeded into seedling breeding sponge blocks with one seed in each hole. Pure water was added into a tray under the seedling breeding sponge blocks until the pure water level height is flushed with the lower surface of the sponge blocks. CK, spectrums of 2 comparative examples and embodiments were set, a light intensity was 250 μmol/m²·s, a light period was 12 h, and a planting period was 18 d. The cherry radish was cultivated according to the above cultivation method, light source parameters were used as each embodiment and comparative example, a fresh weight of each plant of the cherry radish obtained in each embodiment and comparative example was obtained. Results are shown in Table. 3:

TABLE 3

| | | Spectrum feature | | | | | | | | |
|---|---|---|---|---|---|---|---|---|---|---|
| | | Ratio of the number of photons in a waveband of 620 nm to 760 nm to the number of photons in a waveband of 400 nm to 499 nm, peak value (nm), and full width at half maximum (nm) | | | Ratio of the number of photons in a waveband of 620 nm to 760 nm to the number of photons in a waveband of 500 nm to 599 nm Ratio | Proportion 1 (%) of the number of photons in a waveband of 620 nm to 760 nm in the whole light source, proportion 2 (%) of the number of photons in a waveband of 700 nm to 760 nm in the number of the photons in the waveband of 620 nm to 760 nm, peak value, and full width at half maximum (nm) | | | | Biological index |
| Number | Lamp type | Ratio | Peak value | Full width at half maximum | | Proportion 1 | Peak value | Full width at half maximum | Proportion 2 | Fresh weight of single tuberous root/g |
| Comparative Example 3 | Fluorescent lamp | 0.4 | — | — | 0.3 | 12.1 | — | — | 18.3 | 18.03 |
| Comparative Example 4 | LED lamp 5 | 1.4 | 460 | 20 | 7.0 | 52.2 | 660 | 20 | 7.8 | 19.25 |
| Comparative Example 5 | LED lamp 6 | 15.1 | 460 | 20 | 9.1 | 81.2 | 660 | 20 | 6.4 | 20.16 |
| Embodiment 3 | LED lamp 7 | 4.5 | 460 | 20 | 7.3 | 72.0 | 660 | 20 | 7.8 | 24.67 |
| Embodiment 4 | LED lamp 8 (4) | 4.1 | 460 | 20 | 8.0 | 64.0 | 660 | 20 | 16.1 | 25.46 |

Test data shows that: the yield of the light source scheme of the embodiment was at least improved by 36.8% compared with that of a traditional fluorescent lamp.

3. *Cannabis*: planting management: F variety cutting seedlings with good rooting conditions were transplanted into a substrate or rock wool, 4 to 8 plants were put in per square meter, an artificial light source was used, a light intensity was 300 μmol/m² s, an illumination time was 18 h, T=24° C.-26° C., and T=RH70%. Topping was performed when the plant height was about 20 cm to trigger the side branch growth. After the side branches continuously grew for 2 weeks, topping treatment was performed to obtain more branches. After the vegetative growth period was completed, flower promoting treatment was performed for one week, female and male flowers were distinguished, male flowers were removed, and female plants were continuously cultivated. The light source used an HPS as a reference, spectrums of 2 comparative examples and 2 embodiments were set, a light intensity was 750 μmol/m²·s, a light period was 12 h, and a planting period was 100 d. The *cannabis* was cultivated according to the above cultivation method, light source parameters were used as each embodiment and comparative example, a THC total content of the cannabis in each embodiment and comparative example was obtained. Results are shown in Table. 4:

TABLE 4

| | | Spectrum feature | | | | | | | | |
|---|---|---|---|---|---|---|---|---|---|---|
| | | Ratio of the number of photons in a waveband of 620 nm to 760 nm to the number of photons in a waveband of 400 nm to 499 nm, peak value (nm), and full width at half maximum (nm) | | | Ratio of the number of photons in a waveband of 620 nm to 760 nm to the number of photons in a waveband of 500 nm to 599 nm | Proportion 1 (%) of the number of photons in a waveband of 620 nm to 760 nm in the whole light source, proportion 2 (%) of the number of photons in a waveband of 700 nm to 760 nm in the number of the photons in the waveband of 620 nm to 760 nm, peak value, and full width at half maximum (nm) | | | | Biological index |
| Number | Lamp type | Ratio | Peak value | Full width at half maximum | | Proportion 1 | Peak value | Full width at half maximum | Proportion 2 | THC total content (g/plant) |
| Comparative Example 6 | HPS | 6.5 | — | — | 0.5 | 25.3 | — | — | 21.0 | 56.3 |
| Comparative Example 7 | LED lamp 9 | 1.4 | 450 | 20 | 5.1 | 50.6 | 655 | 20 | 25.9 | 57.6 |
| Comparative Example 8 | LED lamp 10 | 10 | 460 | 20 | 12.5 | 81.3 | 660/730 | 20/25 | 18.3 | 50.4 |
| Embodiment 5 | LED lamp 11 | 6.4 | 460 | 20 | 3.6 | 64.3 | 680/730 | 25/25 | 37.4 | 74.6 |
| Embodiment 6 | LED lamp 12 | 5.2 | 435 | 20 | 6.9 | 70.7 | 660/730 | 20/25 | 17.6 | 69.1 |

Test data shows that: the THC total content of the light source scheme of the embodiment was at least improved by 22.7% compared with that of a traditional high-pressure sodium lamp.

4. Cucumber: planting management: full 83-16 fruit cucumber seeds were selected and put into warm water of 55° C. for warm water seed soaking for 10 min, and were then put into clean water of 30° C. for seed soaking for 8 h. The seeds were wrapped by gauzes and put into an incubator of 30° C. for pregermination. After white seed surfaces were exposed, the seeds were seeded into seedling breeding sponge blocks with one seed in each hole. Pure water was added into a tray under the seedling breeding sponge blocks until the pure water level height is flushed with the lower surface of the sponge blocks. After seeding, mist was sprayed onto the seeds by a sprinkling can to maintain surface moisture. Then, the seeds were put under a conventional seedling breeding lamp for illustration treatment. When the cucumber seedlings grew to 4-5 leaves and one shoot, the cucumber seedlings were separately planted onto a water cultivation module, a plantation density was 8 plants/m$^2$, ⅔ root systems were maintained to be soaked into a nutrient solution, an EC of the nutrient solution was 2.2, a pH was 6.0 to 7.0, a temperature of the nutrient solution was 22° C., and a dissolved oxygen content was 6 mg/L. An environment temperature condition was 28° C. at daytime and 18° C. at night. The light source used an HPS as a reference, spectrums of 2 comparative examples and 2 embodiments were set, a light intensity was 400 μmol/m$^2$·s, a light period was 12 h, and a planting period was 50 d. The cucumber was cultivated according to the above cultivation method, light source parameters were used as each embodiment and comparative example, a unit area yield of the cucumber in each embodiment and comparative example was obtained. Results are shown in Table 5:

Test data shows that: the cucumber yield of the light source scheme of the embodiment was at least improved by 22.6% compared with that of a traditional high-pressure sodium lamp.

5. Sweet pepper: planting management: full Jinhuaxing sweet pepper seeds were selected and put into warm water of 55° C. for warm water seed soaking for 10 min, and were then put into clean water of 30° C. for seed soaking for 8 h. The seeds were wrapped by gauzes and put into an incubator of 30° C. for pregermination. After white seed surfaces were exposed, the seeds were seeded into seedling breeding sponge blocks with one seed in each hole. Pure water was added into a tray under the seedling breeding sponge blocks until the pure water level height is flushed with the lower surface of the sponge blocks. After seeding, mist was sprayed onto the seeds by a sprinkling can to maintain surface moisture. Then, the seeds were put under a conventional seedling breeding lamp for illustration treatment. When the sweet pepper seedlings grew to 6-7 leaves and one shoot, the sweet pepper seedlings were separately planted onto a water cultivation module, a plantation density was 8 plants/m$^2$, ⅔ root systems were maintained to be soaked into a nutrient solution, an EC of the nutrient solution was 2.2, a pH was 6.0 to 7.0, a temperature of the nutrient solution was 22° C., and a dissolved oxygen content was 6 mg/L. An environment temperature condition was 26° C. at daytime and 18° C. at night. The light source used a fluorescent lamp as a reference, spectrums of 2 comparative examples and 2 embodiments were set, a light intensity was 400 μmol/m$^2$·s, a light period was 12 h, and a planting period was 120 d. The sweet pepper was cultivated according to the above cultivation method, light source parameters were used as each embodiment and comparative example, a unit area yield of the sweet pepper in each embodiment and comparative example was obtained. Results are shown in Table 6:

TABLE 5

| Number | Lamp type | Ratio of the number of photons in a waveband of 620 nm to 760 nm to the number of photons in a waveband of 400 nm to 499 nm, peak value (nm), and full width at half maximum (nm) | | | Ratio of the number of photons in a waveband of 620 nm to 760 nm to the number of photons in a waveband of 500 nm to 599 nm | Proportion 1 (%) of the number of photons in a waveband of 620 nm to 760 nm in the whole light source, proportion 2 (%) of the number of photons in a waveband of 700 nm to 760 nm in the number of the photons in the waveband of 620 nm to 760 nm, peak value, and full width at half maximum (nm) | | | | Biological index Yield (kg/m$^2$) |
|---|---|---|---|---|---|---|---|---|---|---|
| | | Ratio | Peak value | Full width at half maximum | | Proportion 1 | Peak value | Full width at half maximum | Proportion 2 | |
| Comparative Example 9 | HPS | 6.5 | — | — | 0.5 | 25.3 | — | — | 21.0 | 14.6 |
| Comparative Example 10 | LED lamp 13 | 1.6 | 450 | 20 | 2.0 | 44.4 | 660 | 20 | 11.7 | 13.5 |
| Comparative Example 11 | LED lamp 14 | 9.6 | 450 | 20 | 15.2 | 79.3 | 660 | 20 | 14.7 | 10.6 |
| Embodiment 7 | LED lamp 15 | 4.9 | 460 | 20 | 5.3 | 68.5 | 660 | 20 | 16.2 | 17.9 |
| Embodiment 8 | LED lamp 16 | 6.4 | 435 | 20 | 4.0 | 69.5 | 660/680 | 20/25 | 3.2 | 18.4 |

TABLE 6

| Number | Lamp type | Spectrum feature | | | | | | | | Biological index Yield (kg/m²) |
|---|---|---|---|---|---|---|---|---|---|---|
| | | Ratio of the number of photons in a waveband of 620 nm to 760 nm to the number of photons in a waveband of 400 nm to 499 nm, peak value (nm), and full width at half maximum (nm) | | | Ratio of the number of photons in a waveband of 620 nm to 760 nm to the number of photons in a waveband of 500 nm to 599 nm | Proportion 1 (%) of the number of photons in a waveband of 620 nm to 760 nm in the whole light source, proportion 2 (%) of the number of photons in a waveband of 700 nm to 760 nm in the number of the photons in the waveband of 620 nm to 760 nm, peak value, and full width at half maximum (nm) | | | | |
| | | Ratio | Peak value | Full width at half maximum | | Proportion 1 | Peak value | Full width at half maximum | Proportion 2 | |
| Comparative Example 12 | Fluorescent lamp | 0.4 | — | — | 0.3 | 12.1 | — | — | 18.3 | 11.6 |
| Embodiment 9 | LED lamp 17 | 4.7 | 450 | 20 | 4.1 | 66.4 | 660 | 20 | 8.5 | 13.7 |
| Embodiment 10 | LED lamp 18 | 4.5 | 436/455 | 20/20 | 5.7 | 70.4 | 660/735 | 20/25 | 8.8 | 14.6 |

Test data shows that: the sweet pepper yield of the light source scheme of the embodiment was at least improved by 18.1% compared with that of a traditional fluorescent lamp.

6. Wheat: planting management: full Nongda 212 wheat seeds were selected and were soaked in clean water. After sufficient soaking, the seeds were subjected to seed bud vernalization treatment at a temperature of 4° C. for 15 d. The seed buds subjected to vernalization treatment were seeded into a pot of 30 cm×30 cm, and a cultivation substrate was a mixture of peat and vermiculite according to a ratio of 2V:1V. The substrate was watered if it was dry, and did not need to be watered if it was not dry. A compound fertilizer was applied once about every two weeks, and a concentration was 800 to 1000 times. During head sprouting, monopotassium phosphate was sprayed and applied as foliar fertilizer application, and other management was conventional management. An environment temperature condition was 25° C. at daytime and 18° C. at night. The light source used an HPS as a reference, spectrums of 2 comparative examples and 2 embodiments were set, a light intensity was 500 μmol/m²·s, a light period was 12 h, and a planting period was 100 d. The wheat was cultivated according to the above cultivation method, light source parameters were used as each embodiment and comparative example, a hundred-grain weight of the wheat in each embodiment and comparative example was obtained. Results are shown in Table 7:

Test data shows that: the wheat hundred-grain weight of the light source scheme of the embodiment was at least improved by 34.6% compared with that of a traditional high-pressure sodium lamp.

7. Corn: planting management: corn seeds were wrapped by gauzes and soaked in clean water for pregermination at a temperature of 30° C. to 35° C. During the period, clean water was changed every day. Peat soil and vermiculite were mixed according to a ratio of 2:1, and were charged into a 32-hole seedling breeding tray. After white seed surfaces were exposed, the seeds were seeded at a density of one seed in each hole and a seeding depth of about 2 cm. Soil was covered, the cultivation soil was impregnated by clean water, and covered with a preservative film. The preservative film was removed after budding. When the seedlings grew to 2 leaves and one shoot, the seedlings were transplanted into nutrient bags of 30 cm×30 cm, a cultivation substrate was a mixture of peat and vermiculite according to a ratio of 2V:1V. Since pot cultivation was used, in order to prevent root rot due to excessive water content, watering was performed if the substrate was dry, and watering was not performed if the substrate was not dry. A jointing fertilizer was used in a jointing period, and a compound fertilizer of 800 to 1000 times of liquid was applied once about every two weeks. An environment temperature condition was 25° C. at daytime and 18° C. at night. The light source used an HPS as a reference, spectrums of 2 comparative examples

TABLE 7

| Number | Lamp type | Spectrum feature | | | | | | | | Biological index Hundred-grain weight (g) |
|---|---|---|---|---|---|---|---|---|---|---|
| | | Ratio of the number of photons in a waveband of 620 nm to 760 nm to the number of photons in a waveband of 400 nm to 499 nm, peak value (nm), and full width at half maximum (nm) | | | Ratio of the number of photons in a waveband of 620 nm to 760 nm to the number of photons in a waveband of 500 nm to 599 nm | Proportion 1 (%) of the number of photons in a waveband of 620 nm to 760 nm in the whole light source, proportion 2 (%) of the number of photons in a waveband of 700 nm to 760 nm in the number of photons in the waveband of 620 nm to 760 nm, peak value, and full width at half maximum (nm) | | | | |
| | | Ratio | Peak value | Full width at half maximum | | Proportion 1 | Peak value | Full width at half maximum | Proportion 2 | |
| Comparative Example 13 | HPS | 6.5 | — | — | 0.5 | 25.3 | — | — | 21.0 | 2.6 |
| Embodiment 11 | LED lamp 19 | 6.0 | 450 | 20 | 3.6 | 66.3 | 660/735 | 20/25 | 19.8 | 3.5 |
| Embodiment 12 | LED lamp 20 | 5.5 | 440/460 | 20/20 | 3.8 | 67.0 | 660/740 | 20/25 | 21.4 | 3.7 | and 2 embodiments were set, a light intensity was 500 μmol/m²·s, a light period was 12 h, and a planting period was 100 d. The corn was cultivated according to the above cultivation method, light source parameters were used as each embodiment and comparative example, a corn yield in each embodiment and comparative example was obtained. Results are shown in Table 8:

TABLE 8

| | | Spectrum feature | | | | | | | Biological index |
|---|---|---|---|---|---|---|---|---|---|
| | | Ratio of the number of photons in a waveband of 620 nm to 760 nm to the number of photons in a waveband of 400 nm to 499 nm, peak value (nm), and full width at half maximum (nm) | | | Ratio of the number of photons in a waveband of 620 nm to 760 nm to the number of photons in a waveband of 500 nm to 599 nm | Proportion 1 (%) of the number of photons in a waveband of 620 nm to 760 nm in the whole light source, proportion 2 (%) of the number of photons in a waveband of 700 nm to 760 nm in the number of photons in the waveband of 620 nm to 760 nm, peak value, and full width at half maximum (nm) | | | |
| Number | Lamp type | Ratio | Peak value | Full width at half maximum | | Proportion 1 | Peak value | Full width at half maximum | Proportion 2 | Hundred-grain weight (g) |
| Comparative Example 14 | HPS | 6.5 | — | — | 0.5 | 25.3 | — | — | 21.0 | 28.6 |
| Embodiment 13 | LED lamp 21 | 4.2 | 450 | 20 | 5.1 | 67.8 | 680/730 | 25/25 | 19.7 | 31.9 |
| Embodiment 14 | LED lamp 22 | 5.5 | 440/460 | 20/20 | 3.8 | 67.0 | 660/740 | 20/25 | 21.4 | 32.7 |

Test data shows that: the corn hundred-grain weight of the light source scheme of the embodiment was at least improved by 11.5% compared with that of a traditional high-pressure sodium lamp.

8. Rice: rice seeds were wrapped by gauzes and soaked in clean water for pregermination at a temperature of 35° C. In the period, clean water was changed every day. Peat soil and vermiculite were mixed according to a ratio of 2:1, and were charged into a 72-hole seedling breeding tray. After white seed surfaces were exposed, the seeds were shallowly seeded at a density of one seed in each hole and a seeding depth of 1.5 cm. Soil was covered, the cultivation soil was impregnated by clean water, and covered with a preservative film. The seeds were put under a seedling breeding lamp, and the preservative film was removed after budding. A light period of seedling breeding light was 12 h/d, a light intensity was 250 μmol/m²·s to 300 μmol/m²·s, a self-made nutrient solution 200-time liquid of the company, or a compound fertilizer of 800 to 1000 times of liquid was used, fertilization was performed once every 10 d, and an environment diurnal temperature was 25° C./21° C. After the seedling emergence of rice seedlings for 45 d, the seedlings were transplanted into a cultivation pot, and were then put under a rice cultivation lamp to be cultivated. Fertilization was performed once every 20 d to 25 d. A liquid nitrogen fertilizer of 1000 times of liquid was additionally applied twice in a tillering period, fertilization was performed once every 10 d in a flowering and filling period, fertilization was not performed in a grain color change mature period, and an environment diurnal temperature was 25° C.-28° C./21° C. The light source used an HPS as a reference, spectrums of 2 comparative examples and 2 embodiments were set, a light intensity was 450 μmol/m²·s, a light period was 12 h, and a planting period was 100 d. The rice was cultivated according to the above cultivation method, light source parameters were used as each embodiment and comparative example, a thousand-grain weight and the setting rate of the rice in each embodiment and comparative example was obtained. Results are shown in Table 9.

TABLE 9

| | | Spectrum feature | | | | | | | | Biological index | |
|---|---|---|---|---|---|---|---|---|---|---|---|
| | | Ratio of the number of photons in a waveband of 620 nm to 760 nm to the number of photons in a waveband of 400 nm to 499 nm, peak value (nm), and full width at half maximum (nm) | | | Ratio of the number of photons in a waveband of 620 nm to 760 nm to the number of photons in a waveband of 500 nm to 599 nm | Proportion 1 (%) of the number of photons in a waveband of 620 nm to 760 nm in the whole light source, proportion 2 (%) of the number of photons in a waveband of 700 nm to 760 nm in the number of photons in the waveband of 620 nm to 760 nm, peak value, and full width at half maximum (nm) | | | | | |
| Number | Lamp type | Ratio | Peak value | Full width at half maximum | | Proportion 1 | Peak value | Full width at half maximum | Proportion 2 | TKW (g) | Setting rate (%) |
| Comparative Example 15 | HPS | 6.5 | — | — | 0.5 | 25.3 | — | — | 21.0 | 21.7 | 75.8 |
| Embodiment 15 | LED lamp 23 | 4.2 | 450 | 20 | 5.1 | 67.8 | 680/730 | 25/25 | 19.7 | 25.2 | 80.1 |
| Embodiment 16 | LED lamp 24 | 5.5 | 440/460 | 20/20 | 3.8 | 67.0 | 660/740 | 20/25 | 21.4 | 24.1 | 79.0 |

Test data shows that: the rice thousand-grain weight of the light source scheme of the embodiment was at least improved by 11.1% and the setting rate was improved by at least 4.2% compared with those of a traditional high-pressure sodium lamp.

9. *Anoectochilus formosanus*: *Anoectochilus formosanus* seedlings were taken out from a tissue culture bottle, a substrate was cleanly flushed by clean water, and the completeness of stems and roots should be ensured in the flushing process. After the clean flushing, the seedlings were put into a potassium permanganate solution with a concentration of 0.1% to be soaked for 5 min for disinfection and sterilization. The sterilized seedlings were put into a sterile pot for use. After the potassium permanganate on the leaf surfaces of the *Anoectochilus formosanus* was evaporated, the seedlings were separately planted into a mixed substrate prepared from peat soil, vermiculite and river sand according to a ratio of 1:1:1 (the substrate had subjected to autoclaved sterilization), a specific nutrient solution was used to replace sterile water for mixing, and a soil humidity was 80%. The substrate was separately charged into planting pots of 25 cm*25 cm*25 cm. After the separate planting of the *Anoectochilus formosanus* seedlings according to a certain plant gap of 2 cm was completed, the *Anoectochilus formosanus* seedlings were moved in an artificial light environment for cultivation. The light source used a fluorescent lamp as a reference, spectrums of 2 comparative examples and 2 embodiments were set, a light intensity was 60±5 μmol/m²·s, a light period was 14 h/d, and a planting period was 120 d. The *Anoectochilus formosanus* was cultivated according to the above cultivation method, light source parameters were used as each embodiment and comparative example, a fresh weight and a dry weight of the *Anoectochilus formosanus* in each embodiment and comparative example were obtained. Results are shown in Table 10:

Test data shows that: the *Anoectochilus formosanus* fresh weight and dry weight of the light source scheme of the embodiment were at least improved by 30.6% and 25.2% compared with those of a traditional fluorescent lamp.

10. *Dendrobium huoshanense*: *Dendrobium huoshanense* seedlings were taken out from a tissue culture bottle, a substrate was cleanly flushed by clean water, and the completeness of stems and roots should be ensured in the flushing process. After the clean flushing, the seedlings were put into chlorothalonil with a concentration of 1000 times of liquid for disinfection and sterilization. The sterilized seedlings were put into a sterile pot for use. After the *Dendrobium huoshanense* tissue culture seedlings rooted and became white, the seedlings were separately planted into a big pine bark substrate, and the substrate was soaked for 1 d by clean water in advance. The *Dendrobium huoshanense* seedlings were separately planted according to a certain plant gap of 3 cm. Then, the planting pot was moved in an artificial light environment for cultivation. After the transplantation for 2 weeks, a leaf fertilizer was sprayed and applied to prevent and treat yellow leaves. In the whole cultivation process, a specific nutrient solution was sprayed once every 15 d, a substrate humidity was maintained at 70%, and a diurnal temperature of the cultivation temperature was 28° C./21° C. The light source used a fluorescent lamp as a reference, spectrums of 2 comparative examples and 2 embodiments were set, a light intensity was 60±5 μmol/m²·s, a light period was 16 h/d, and a planting period was 120 d. The *Dendrobium huoshanense* was cultivated according to the above cultivation method, light source parameters were used as each embodiment and comparative example, a fresh weight and a dry weight of the *Dendrobium huoshanense* in each embodiment and comparative example were obtained. Results are shown in Table 11:

TABLE 10

| | | Spectrum feature | | | | | | | | Biological index | |
| --- | --- | --- | --- | --- | --- | --- | --- | --- | --- | --- | --- |
| | | Ratio of the number of photons in a waveband of 620 nm to 760 nm to the number of photons in a waveband of 400 nm to 499 nm, peak value (nm), and full width at half maximum (nm) | | | Ratio of the number of photons in a waveband of 620 nm to 760 nm to the number of photons in a waveband of 500 nm to 599 nm | Proportion 1 (%) of the number of photons in a waveband of 620 nm to 760 nm in the whole light source, proportion 2 (%) of the number of photons in a waveband of 700 nm to 760 nm in the number of the photons in the waveband of 620 nm to 760 nm, peak value, and full width at half maximum (nm) | | | | | |
| Number | Lamp type | Ratio | Peak value | Full width at half maximum | | Proportion 1 | Peak value | Full width at half maximum | Proportion 2 | Fresh weight (g/plant) | Dry weight (g/plant) |
| Comparative Example 16 | Fluorescent lamp | 0.4 | — | — | 0.3 | 12.1 | — | — | 18.3 | 2.81 | 217.54 |
| Embodiment 17 | LED lamp 25 | 3.5 | 435 | 20 | 5.4 | 66.4 | 660/685 | 20/25 | 4.6 | 3.67 | 273.86 |
| Embodiment 18 | LED lamp 26 | 5.0 | 450 | 20 | 5.7 | 66.6 | 650 | 70 | 23.4 | 3.80 | 272.36 |

TABLE 11

| Number | Lamp type | Ratio of the number of photons in a waveband of 620 nm to 760 nm to the number of photons in a waveband of 400 nm to 499 nm, peak value (nm), and full width at half maximum (nm) | | | Ratio of the number of photons in a waveband of 620 nm to 760 nm to the number of photons in a waveband of 500 nm to 599 nm | Proportion 1 (%) of the number of photons in a waveband of 620 nm to 760 nm in the whole light source, proportion 2 (%) of the number of photons in a waveband of 700 nm to 760 nm in the number of the photons in the waveband of 620 nm to 760 nm, peak value, and full width at half maximum (nm) | | | | Biological index | |
|---|---|---|---|---|---|---|---|---|---|---|---|
| | | Ratio | Peak value | Full width at half maximum | | Proportion 1 | Peak value | Full width at half maximum | Proportion 2 | Fresh weight (g/plant) | Dry weight (g/plant) |
| Comparative Example 17 | Fluorescent lamp | 0.4 | — | — | 0.3 | 12.1 | — | — | 18.3 | 0.51 | 72.25 |
| Embodiment 19 | LED lamp 27 | 6.2 | 436/455 | 20/20 | 6.7 | 74.6 | 675/695 | 25/25 | 13.3 | 0.59 | 95.50 |
| Embodiment 20 | LED lamp 28 | 6.4 | 450 | 20 | 4.5 | 68.2 | 690 | 25 | 27.2 | 0.57 | 80.29 |

Test data shows that: the *Dendrobium huoshanense* fresh weight and dry weight of the light source scheme of the embodiment were at least improved by 11.7% and 11.1% compared with those of a traditional fluorescent lamp.

11. Pansy cultivation: full pansy seeds were selected, were soaked in clean water for 4 h, and were then seeded into seedling breeding sponge blocks with one seed in each hole. Pure water was added into a tray under the seedling breeding sponge blocks until the pure water level height is flushed with the lower surface of the sponge blocks. After seeding, the seeds were put into a pregermination box of 24° C. for pregermination, and the humidity was maintained at 70%. Mist was sprayed onto the seeds every 24 h. When the pansy seedlings grew to 4-5 leaves and one shoot, the pansy seedlings were separately planted onto a water cultivation module, ⅔ root systems were maintained to be soaked into a nutrient solution, an EC of the nutrient solution was 1.6, a pH was 6.0, a temperature of the nutrient solution was 20° C., and a dissolved oxygen content was 5 mg/L. An environment temperature condition was 23° C. at daytime and 18° C. at night. The light source used a fluorescent lamp as a reference, spectrums of 2 comparative examples and 2 embodiments were set, a light intensity was 300 μmol/m²·s, a light period was 12 h, and a planting period was 25 d. The pansy was cultivated according to the above cultivation method, light source parameters were used as each embodiment and comparative example, a pansy flowering quantity in each embodiment and comparative example was obtained. Results are shown in Table 12:

TABLE 12

| Number | Lamp type | Ratio of the number of photons in a waveband of 620 nm to 760 nm to the number of photons in a waveband of 400 nm to 499 nm, peak value (nm), and full width at half maximum (nm) | | | Ratio of the number of photons in a waveband of 620 nm to 760 nm to the number of photons in a waveband of 500 nm to 599 nm | Proportion 1 (%) of the number of photons in a waveband of 620 nm to 760 nm in the whole light source, proportion 2 (%) of the number of photons in a waveband of 700 nm to 760 nm in the number of the photons in the waveband of 620 nm to 760 nm, peak value, and full width at half maximum (nm) | | | | Biological index Flowering quantity (flowers/plant) |
|---|---|---|---|---|---|---|---|---|---|---|
| | | Ratio | Peak value | Full width at half maximum | | Proportion 1 | Peak value | Full width at half maximum | Proportion 2 | |
| Comparative Example 18 | Fluorescent lamp | 0.4 | — | — | 0.3 | 12.1 | — | — | 18.3 | 182 |
| Embodiment 21 | LED lamp 29 | 5.5 | 440/460 | 20/20 | 8.0 | 75 | 660/735 | 20/25 | 18.4 | 228 |
| Embodiment 22 | LED lamp 30 | 4.3 | 450 | 20 | 5.3 | 70 | 695 | 25 | 36.6 | 215 |

Test data shows that: the pansy flowering quality of the light source scheme of the embodiment was at least improved by 18.1% compared with that of a traditional fluorescent lamp.

Although the foregoing embodiments have been described, those skilled in the art can make additional changes and modifications to these embodiments once they learn the basic creative concept. Therefore, the foregoing description is only the embodiments of the present invention, and does not limit the scope of patent protection of the present invention. An equivalent structure or an equivalent process transformation made by using the specification of the present invention, or direct or indirect application to other related technical fields are included within the protection scope of the present invention.

What is claimed is:

1. A light source for simultaneously cultivating a plurality of plants indoor, wherein
   the light source consists of a light wave with a waveband of 620 nm to 760 nm, a light wave with a waveband of 400 nm to 499 nm, and a light wave with a waveband of 500 nm to 599 nm;

the number of photons of the light wave of 620 nm to 760 nm accounts for 64% to 76% of the total number of photons of the light source; a ratio of the number of the photons of the light wave with the waveband of 620 nm to 760 nm to the number of photons of the light wave with the waveband of 400 nm to 499 nm is 4-7:1; a ratio of the number of the photons of the light wave with the waveband of 620 nm to 760 nm to the number of photons of the light wave with the waveband of 500 nm to 599 nm is 3-8:1;

the plurality of plants comprises a leaf vegetable, a root vegetable, cannabis, cucumber, sweet pepper, wheat, corn, rice, *Anoectochilus formosanus, Dendrobium huoshanense*, and pansy.

2. The light source according to claim 1, wherein the number of photons in a waveband of 700 nm to 760 nm in the light source accounts for 3% to 38% of the number of the photons in the waveband of 620 nm to 760 nm.

3. The light source according to claim 2, wherein a peak wavelength of the light wave with the waveband of 620 nm to 760 nm is in a range of 650 nm to 700 nm or 730 nm to 740 nm.

4. The light source according to claim 3, wherein the peak wavelength of the light wave with the waveband of 620 nm to 760 nm is one or a combination of two or three of 650 nm, 660 nm, 680 nm, 695 nm, and 735 nm.

5. The light source according to claim 3, wherein a full width at half maximum of the light wave corresponding to the peak wavelength in the range of 650 nm to 700 nm or 730 nm to 740 nm is smaller than 35 nm.

6. The light source according to claim 5, wherein a peak wavelength of the light wave with the waveband of 400 nm to 499 nm is in a range of 430 nm to 460 nm.

7. The light source according to claim 6, wherein the peak wavelength of the light wave with the waveband of 400 nm to 499 nm is one or a combination of two or three of 435 nm, 440 nm, 450 nm, and 460 nm.

8. The light source according to claim 6, wherein a full width at half maximum of the light wave corresponding to the peak wavelength in the range of 430 nm to 460 nm is smaller than 35 nm.

* * * * *